(12) United States Patent
Tanahashi et al.

(10) Patent No.: US 9,835,783 B2
(45) Date of Patent: Dec. 5, 2017

(54) OPTICAL FIBER HOLDING STRUCTURE

(71) Applicant: PANASONIC INTELLECTUAL PROPERTY MANAGEMENT CO., LTD., Osaka (JP)

(72) Inventors: Osamu Tanahashi, Kyoto (JP); Hideharu Kawachi, Hyogo (JP); Shinichi Anami, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 36 days.

(21) Appl. No.: 15/189,088

(22) Filed: Jun. 22, 2016

(65) Prior Publication Data

US 2016/0377783 A1 Dec. 29, 2016

(30) Foreign Application Priority Data

Jun. 26, 2015 (JP) .................. 2015-129306

(51) Int. Cl.
*G02B 6/00* (2006.01)
*F21V 8/00* (2006.01)
*F21V 7/00* (2006.01)

(52) U.S. Cl.
CPC .............. *G02B 6/001* (2013.01); *F21V 7/005* (2013.01)

(58) Field of Classification Search
CPC ............................ G02B 6/001; F21V 19/009
See application file for complete search history.

(56) References Cited

U.S. PATENT DOCUMENTS

| 2005/0248936 | A1* | 11/2005 | Lee ................. | F21V 19/009 362/97.2 |
| 2005/0281037 | A1* | 12/2005 | Murakami ............ | F21V 19/009 362/382 |
| 2006/0028837 | A1* | 2/2006 | Mrakovich ............ | G02B 6/001 362/602 |

FOREIGN PATENT DOCUMENTS

| JP | S58-157301 | 10/1983 |
| JP | H06-186428 | 7/1994 |
| JP | H06-063437 | 9/1994 |
| JP | 2012-237863 | 12/2012 |
| JP | 2014-186234 | 10/2014 |

* cited by examiner

*Primary Examiner* — Evan Dzierzynski
(74) *Attorney, Agent, or Firm* — Greenblum & Bernstein, P.L.C.

(57) ABSTRACT

An optical fiber holding structure includes a light-transmitting tube configured to cover a surface-light-emitting optical fiber and a fixture configured to fix the tube to a building material. The tube is made of a material having such rigidity that the tube is not bent even when the tube is horizontally fixed by the fixture. The tube has a notch through which the optical fiber is introduced into the tube. The fixture includes an engaging portion, a mounting portion and a leg portion. The engaging portion is inserted into the tube through the notch to engage with an inner circumference of the tube. The mounting portion is mounted to the building material. The leg portion is configured to interconnect the engaging portion and the mounting portion with a predetermined gap left therebetween.

8 Claims, 10 Drawing Sheets

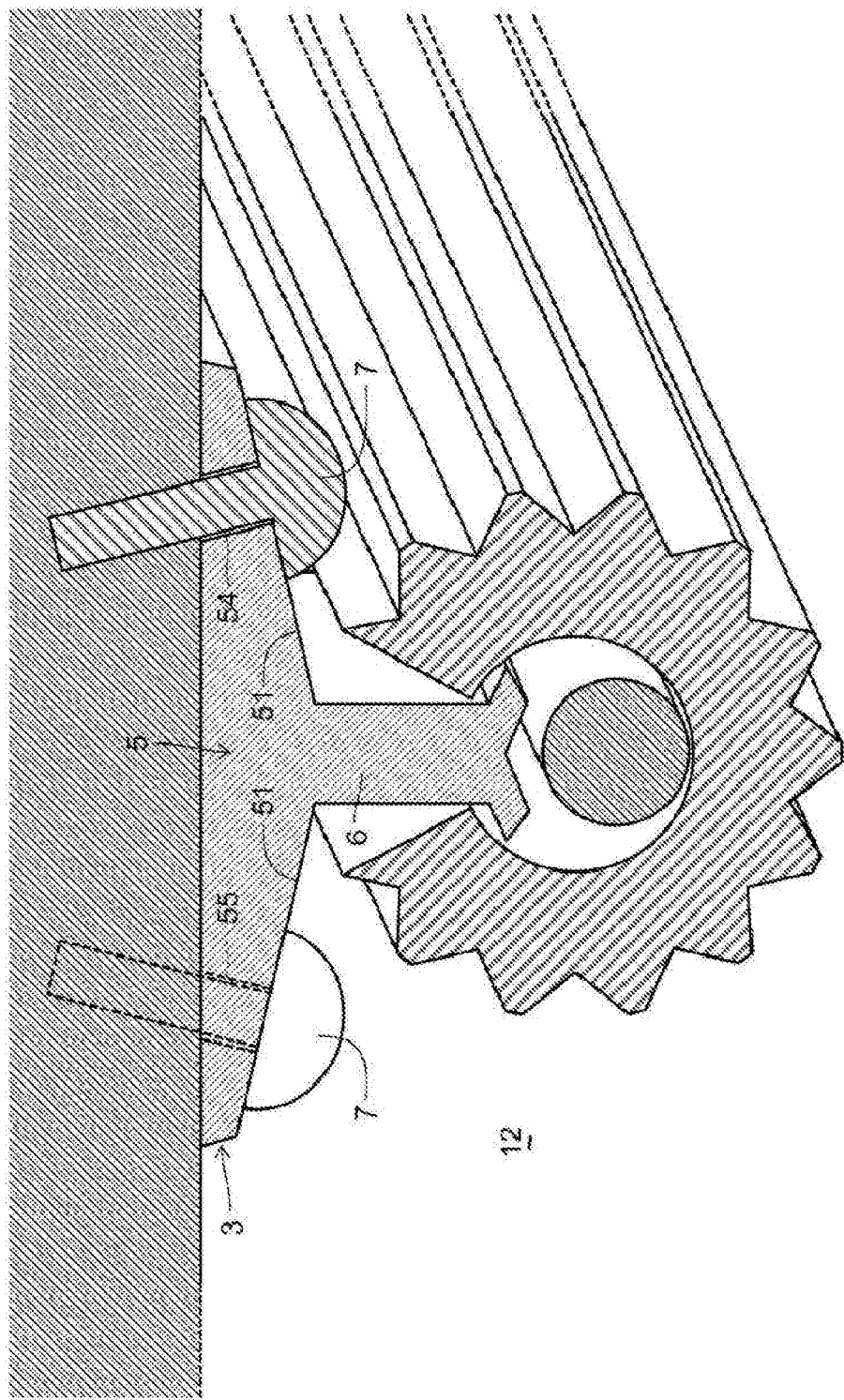

OPTICAL FIBER HOLDING STRUCTURE

CROSS-REFERENCE TO RELATED APPLICATIONS

This application claims priority to Japanese Patent Application No. 2015-129306 filed on Jun. 26, 2015, the entire contents of which are incorporated herein by reference.

TECHNICAL FIELD

The disclosure relates to an optical fiber holding structure for fixing a surface-light-emitting optical fiber to a building material.

BACKGROUND ART

In the related art, surface-light-emitting optical fibers are collected in a bundle form, a sheet form or a string form and are used as a light source of an illumination device (see, e.g., Japanese Unexamined Patent Application Publication No. 1994-186428). The optical fibers are fixed to, for example, a building material of a ceiling, a wall or the like in a living space and can be used in illuminating and decorating the ceiling or the wall.

However, if the aforementioned optical fibers are directly installed in the ceiling or the wall, brightness unevenness may be generated in the ceiling or the wall because the ceiling or the wall existing near the optical fibers are locally illuminated by the light emitted from the optical fibers. Further, in general, the optical fibers have flexibility and, therefore, the optical fibers mounted to the ceiling or the wall tend to be bent by their own weight.

SUMMARY OF THE INVENTION

In view of the above, the disclosure provides an optical fiber holding structure capable of fixing an optical fiber to a building material while preventing occurrence of brightness unevenness and bending of the optical fiber otherwise caused by its own weight.

In accordance with a first aspect, there is provided an optical fiber holding structure including a light-transmitting tube configured to cover a surface-light-emitting optical fiber and a fixture configured to fix the tube to a building material. The tube is made of a material having such rigidity that the tube is not bent even when the tube is horizontally fixed by the fixture. The tube has a notch through which the optical fiber is introduced into the tube. The fixture includes an engaging portion, a mounting portion and a leg portion. The engaging portion is inserted into the tube through the notch to engage with an inner circumference of the tube. The mounting portion is mounted to the building material. The leg portion is configured to interconnect the engaging portion and the mounting portion with a predetermined gap left therebetween.

According to the optical fiber holding structure, the optical fiber is fixed by a fixture in a spaced-apart relationship with the building material. Thus, the building material existing near the optical fiber is not locally illustrated by the light emitted from the optical fiber. It is therefore possible to prevent occurrence of brightness unevenness. In addition, the tube covering the optical fiber is configured so as not to be bent. It is therefore possible to prevent bending of the optical fiber otherwise caused by its own weight.

BRIEF DESCRIPTION OF THE DRAWINGS

The figures depict one or more implementations in accordance with the present teaching, by way of example only, no by way of limitations. In the figures, like reference numerals refer to the same or similar elements.

FIG. 7 is a sectional perspective view of an optical fiber holding structure according to a second modification of the aforementioned embodiment.

DETAILED DESCRIPTION OF THE PREFERRED EMBODIMENTS

Figure 1:
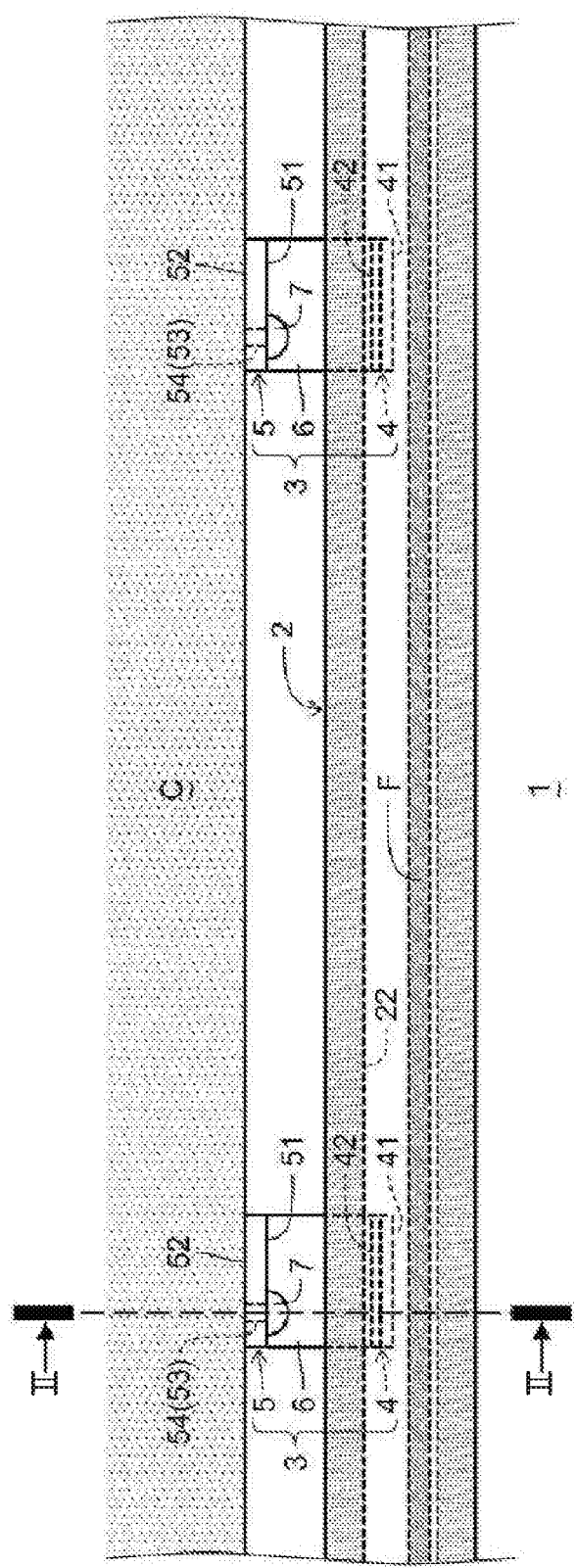
FIG. 1 is a side view of an optical fiber holding structure according to one embodiment.
Figure 2:
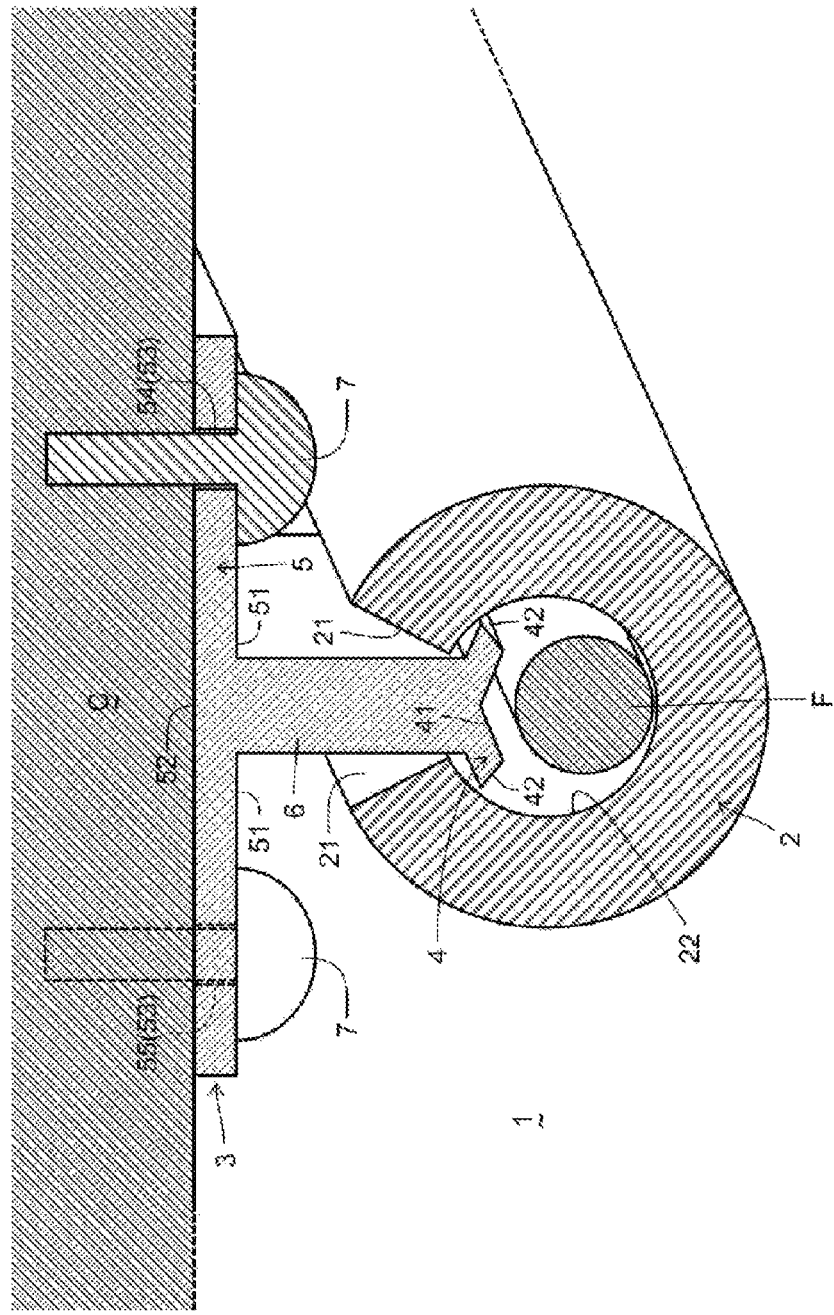
FIG. 2 is a sectional perspective view taken along line II-II in FIG. 1.

An optical fiber holding structure according to one embodiment will be described with reference to FIGS. 1 to 4. As illustrated in FIGS. 1 and 2, the optical fiber holding structure 1 includes a light-transmitting tube 2 configured to cover a surface-light-emitting optical fiber F and a fixture 3 for fixing the tube 2 to a ceiling C (a building material).

The tube 2 is made of a material having such rigidity and elasticity that the tube 2 is not bent even when the tube 2 is horizontally fixed by the fixture 3, for example, a polyethylene terephthalate (PET) resin or a polycarbonate resin. The tube 2 has a notch 21 (see FIG. 2) formed in a linear fashion along an extension direction of the tube 2. The tube 2 is formed in a C-like shape when viewed in a cross section. The notch 21 is used as an introduction port through which the optical fiber F is introduced into the tube 2. Therefore, as compared with a case where the optical fiber F is inserted from one end of the tube 2, it is possible to easily introduce the optical fiber F into the tube 2.

The fixture 3 includes an engaging portion 4 inserted into the tube 2 through the notch 21 to engage with an inner circumference 22 of the tube 2, a mounting portion 5 mounted to the ceiling C, and a leg portion 6 configured to interconnect the engaging portion 4 and the mounting portion 5 with a predetermined gap left therebetween. The leg portion 6 is formed in the shape of a band extending in one direction and is connected to the center of the mounting portion 5 formed in a flat plate shape. The mounting portion 5 has a connecting surface 51 to which the leg portion 6 is connected, a flat mounting surface 52 positioned at the opposite side from the connecting surface 51 and mounted to the ceiling C, and screw holes 53 formed so as to extend from the mounting surface 52 to the connecting surface 51.

In the illustrated example, the screw holes 53 are formed in a plural number so as to interpose the leg portion 6 therebetween. The screw holes 53 includes a screw hole 54 formed at one side of the leg portion 6 and a screw hole 55 formed at the other side of the leg portion 6. Screws 7 for fixing the fixture 3 to the ceiling C are inserted into the screw holes 54 and 55.

The engaging portion 4 is formed in a hook shape so as to engage with the inner circumference 22 of the tube 2. The engaging portion 4 has an opposing surface 41 opposed to the optical fiber F when the engaging portion 4 is brought into engagement with the tube 2. The opposing surface 41 is configured to have light reflectivity. Furthermore, opposite end portions 42 of the opposing surface 41 are formed in a taper shape inclined toward the leg portion 6 as the opposite end portions 42 extend outward.

Figure 3:
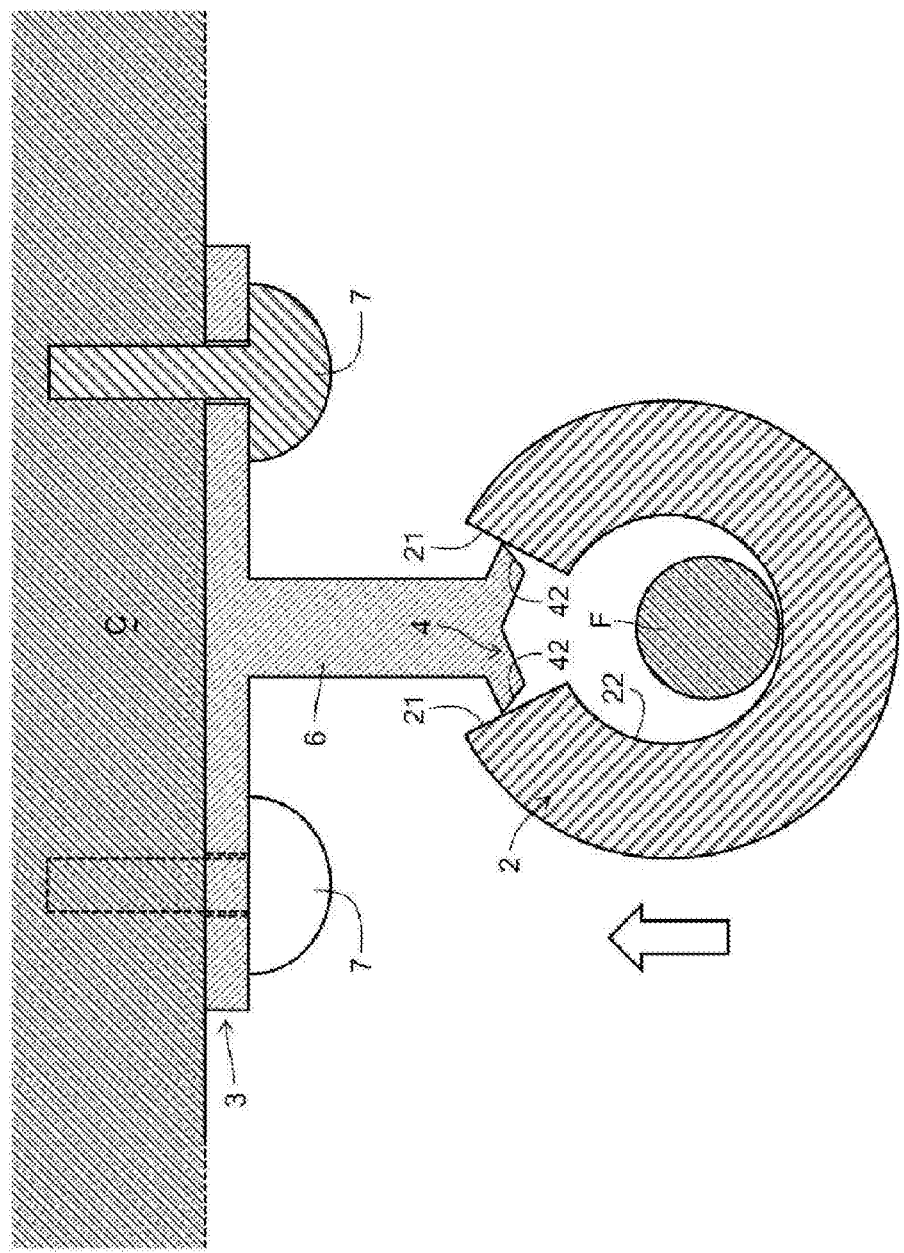
FIG. 3 is a view illustrating an operation when an optical fiber is fixed to a ceiling by use of the optical fiber holding structure.

A procedure of fixing the optical fiber F to the ceiling C using the optical fiber holding structure 1 configured as above will be described with reference to FIG. 3. First, the fixture 3 is fixed to the ceiling C with the screws 7 so that the fixture 3 extends along the tube 2 to which the leg portion 6 is to be fixed. Then, the tube 2, into which the optical fiber F is introduced, is pushed toward the fixture 3 in such a state that the notch 21 and the engaging portion 4 face each other, thereby allowing the engaging portion 4 to engage with the inner circumference 22 of the tube 2. At this time, the notch 21 can be promptly enlarged by the engaging portion 4 because the end portions 42 of the engaging portion 4 are formed in a taper shape. In this way, the tube 2 holding the optical fiber F is fixed to the fixture 3 mounted to the ceiling C.

Figure 4:
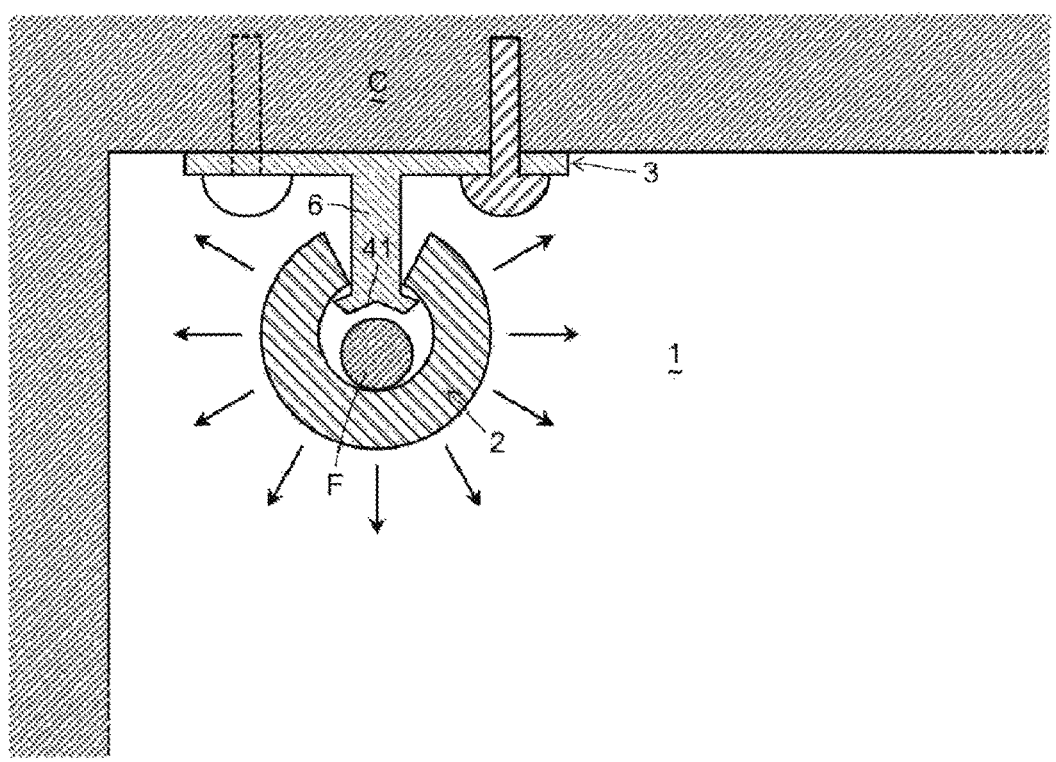
FIG. 4 is a view illustrating a state in which the optical fiber is fixed to the ceiling by use of the optical fiber holding structure.

As illustrated in FIG. 4, according to the optical fiber holding structure 1, the optical fiber F is fixed by the fixture 3 in a spaced-apart relationship with the ceiling C. Thus, the ceiling C existing near the optical fiber F is not locally illuminated by the light (indicated by arrows) emitted from the optical fiber F. This makes it possible to prevent occurrence of brightness unevenness in the ceiling C and to improve the appearance of the ceiling C. Since the tube 2 covering the optical fiber F is configured so as not to be bent, it is possible to prevent bending of the optical fiber F otherwise caused by its own weight. Inasmuch as the opposing surface 41 of the engaging portion 4 has light reflectivity, it is possible for the opposing surface 41 to reflect the light irradiated from the optical fiber F, thereby improving the illumination efficiency.

Figure 5:
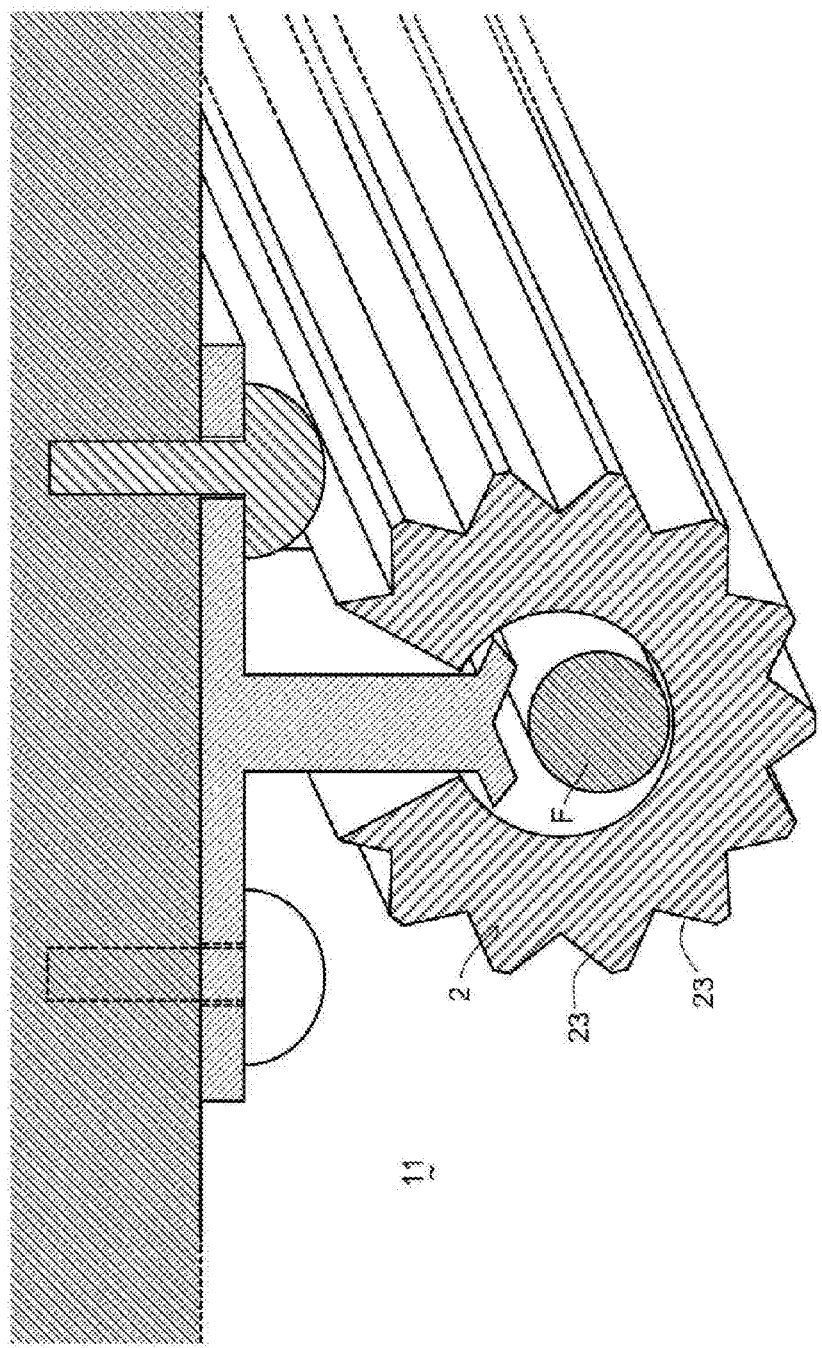
FIG. 5 is a sectional perspective view of an optical fiber holding structure according to a first modification of the aforementioned embodiment.
Figure 6:
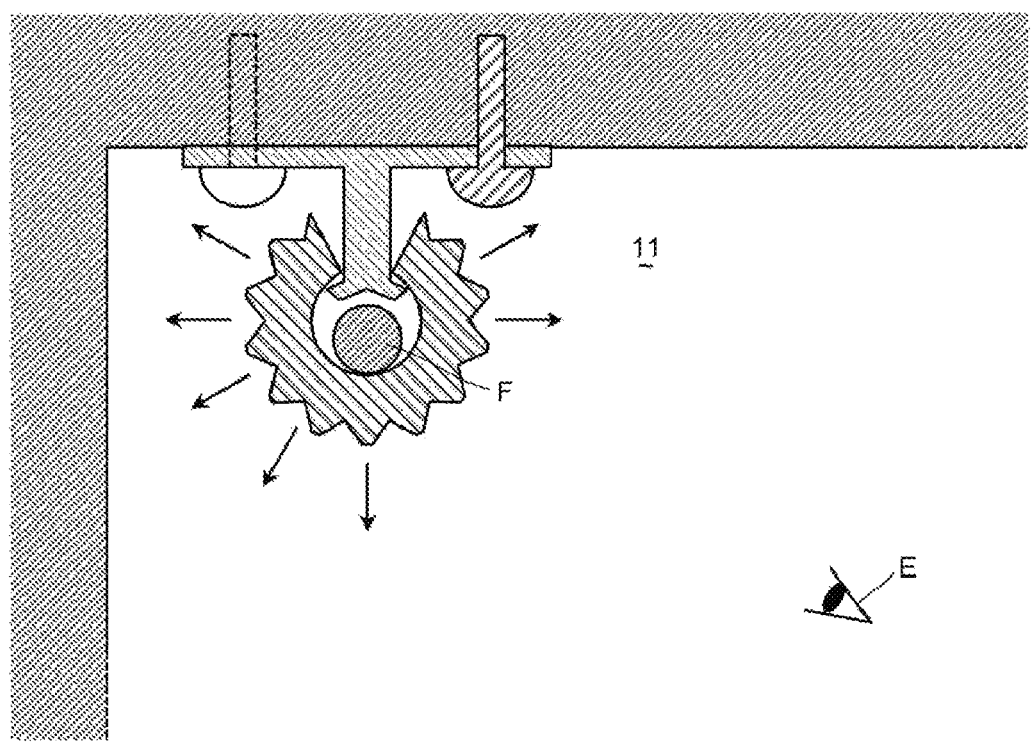
FIG. 6 is a view illustrating a state in which an optical fiber is fixed to a ceiling by use of the optical fiber holding structure according to the first modification.

Next, an optical fiber holding structure according to a first modification of the aforementioned embodiment will be described with reference to FIGS. 5 and 6. As illustrated in FIG. 5, in the optical fiber holding structure 11 of the present modification, the tube 2 has a concave-convex structure 23 formed on the outer surface thereof to control light distribution of emitted light. In the illustrated example, the concave-convex structure 23 is formed of a prism structure having flat slant surfaces. Moreover, a concave-convex structure may be formed on the inner surface of the tube 2. Concave-convex structures may be formed on the inner and outer surfaces of the tube 2.

According to the optical fiber holding structure 11, it is possible not only to achieve the same effects as achieved by the aforementioned optical fiber holding structure 1 but also to control distribution of the light emitted from the optical fiber F using the concave-convex structure 23. Thus, for example, as illustrated in FIG. 6, it is possible to control light distribution so that the light emitted from the optical fiber F does not directly enter the eyes E of a user, thereby preventing the user from feeling a glare.

Figure 8A:
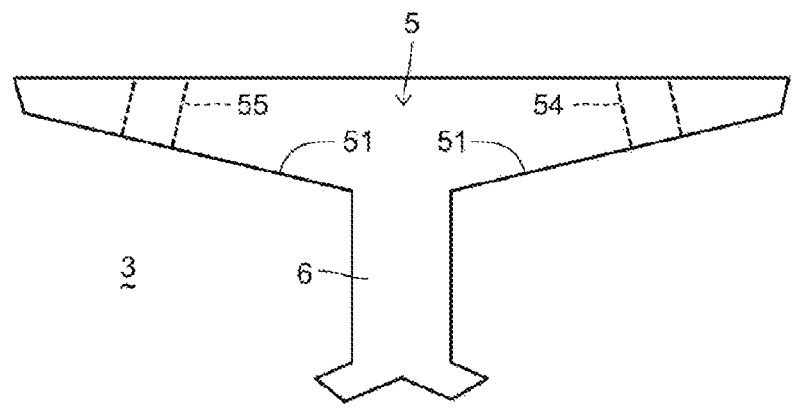
FIG. 8A is a front view of a fixture that constitutes the optical fiber holding structure.
Figure 8B:
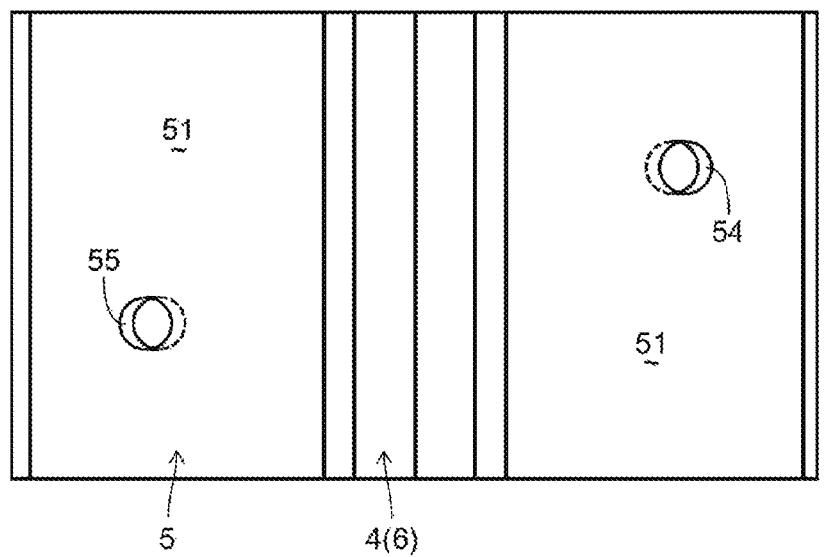
FIG. 8B is a top view of the fixture.

Next, an optical fiber holding structure according to a second modification of the aforementioned embodiment will be described with reference to FIGS. 7, 8A and 8B. The optical fiber holding structure 12 of the present modification is based on the optical fiber holding structure 11 described above and is provided with a mounting portion 5 having a modified structure. The mounting portion 5 of the optical fiber holding structure 12 has a connecting surface 51 which is inclined so that the mounting portion 5 becomes thinner as the mounting portion 5 extends away from the leg portion 6. Screw holes 54 and 55 are formed in an orthogonal relationship with the connecting surface 51 and are disposed in an asymmetrical relationship with the leg portion 6 (see FIG. 8B).

According to the optical fiber holding structure 12, it is possible to achieve the same effects as achieved by the aforementioned optical fiber holding structure 1. In addition, since the screw holes 54 and 55 are inclined, the screws 7 and the tool for tightening the screws 7 do not interfere with the leg portion 6 when fixing the fixture 3 to the ceiling C. Inasmuch as the screws 7 and the tool do not interfere with the leg portion 6, it becomes possible to form the screw holes 54 and 55 in close proximity to the leg portion 6, thereby reducing the size of the mounting portion 5. Since the screw holes 54 and 55 are disposed in an asymmetrical relationship with the leg portion 6, it is possible to prevent the distal ends of the screws 7 fixed through the screw holes 54 and 55 from interfering with each other within the ceiling C. This makes it possible to reliably fix the fixture 3 to the ceiling C.

Figure 9:
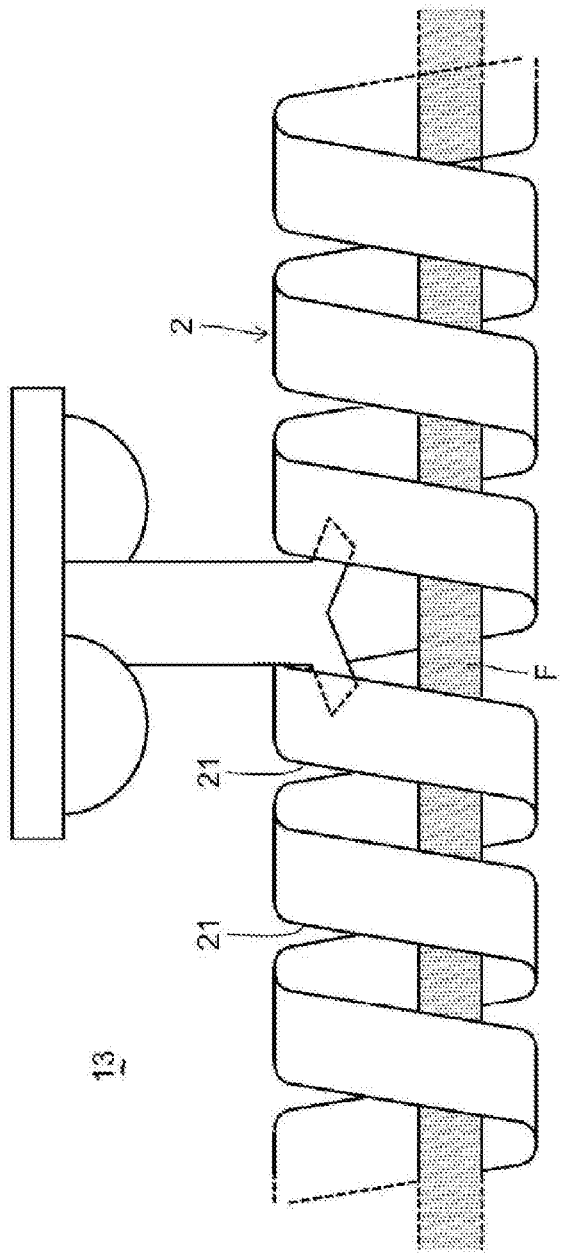
FIG. 9 is a side view of an optical fiber holding structure according to a third modification of the aforementioned embodiment.

Next, an optical fiber holding structure according to a third modification of the aforementioned embodiment will be described with reference to FIG. 9. The optical fiber holding structure 13 of the present modification is based on the optical fiber holding structure 1 described above and is provided with a notch 21 of a tube 2 having a modified structure. The notch 21 of the optical fiber holding structure 13 is formed in a spiral shape along an extension direction of the tube 2. Introduction of the optical fiber F into the tube 2 is performed by winding the optical fiber F around the tube 2 along the notch 21. According to the optical fiber holding structure 13, it is possible to achieve the same effects as achieved by the aforementioned optical fiber holding structure 1.

Next, an optical fiber holding structure according to a fourth modification of the aforementioned embodiment will be described with reference to FIGS. 10A and 10B. The optical fiber holding structure 14 of the present modification is based on the optical fiber holding structure 1 described above and is further provided with a reflection plate 8 that covers a portion of the outer surface of the tube 2. The reflection plate 8 has high light reflectivity and is made of an easily moldable material, for example, aluminum.

Figure 10A:
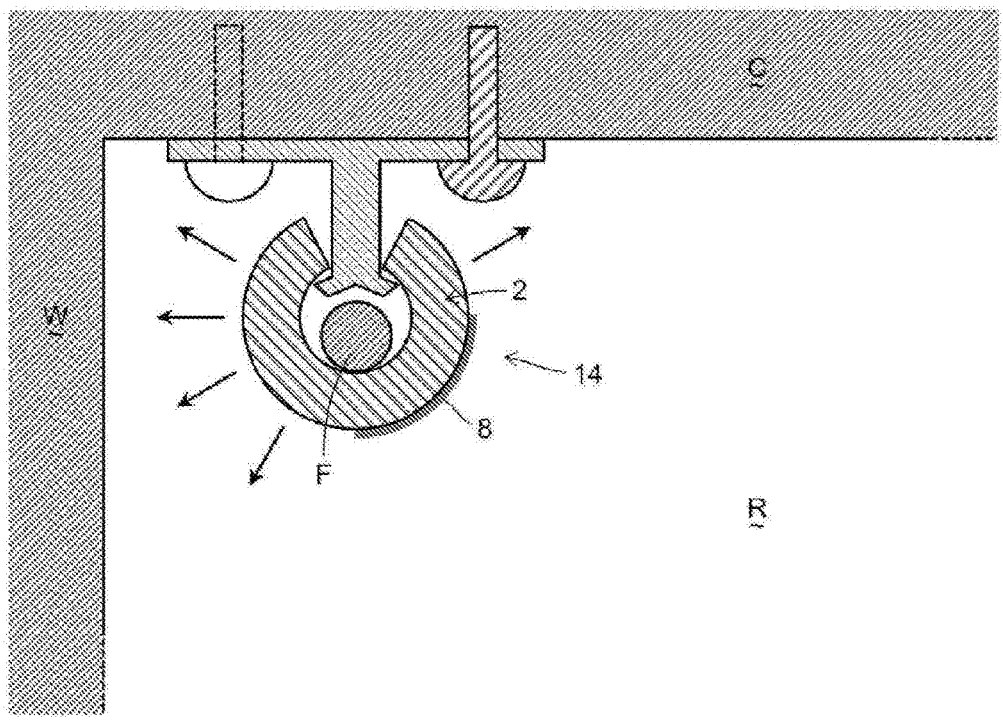
FIGS. 10A and 10B are views illustrating a state in which an optical fiber is fixed to a ceiling by use of an optical fiber holding structure according to a fourth modification of the aforementioned embodiment.
Figure 10B:
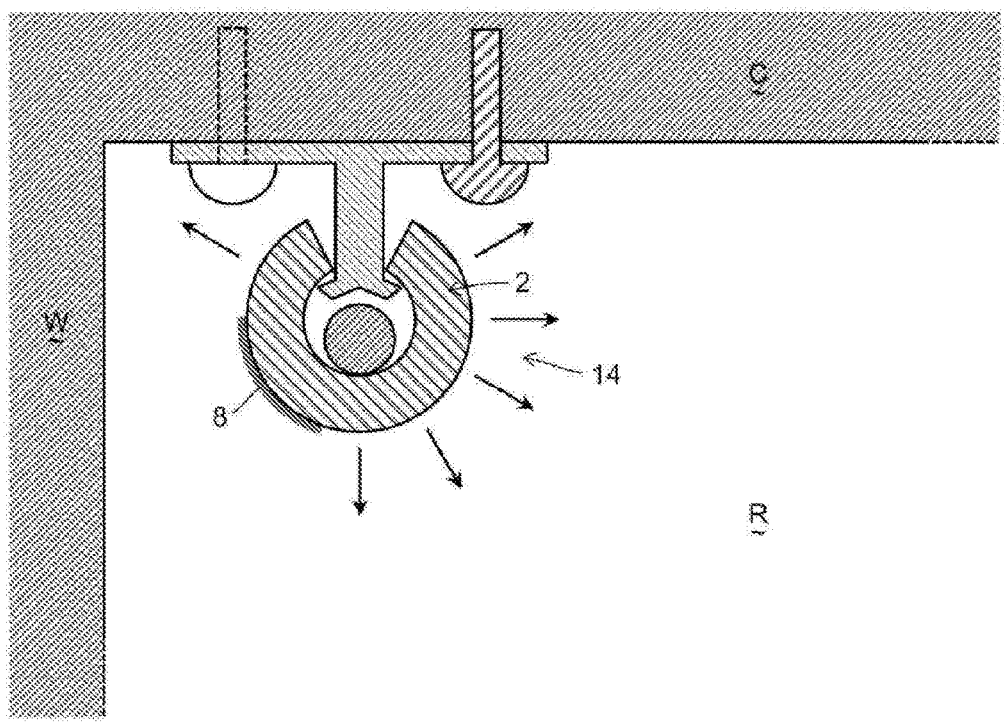

As illustrated in FIG. 10A, for example, the reflection plate 8 is provided so as to cover a portion of the tube 2 at the side of living space R. Thus, the light from the optical fiber F is emitted toward the ceiling C and the wall W and is irradiated, as indirect light, to the living space R. On the other hand, if the reflection plate 8 is provided so as to cover a portion of the tube 2 at the side of the wall W as illustrated in FIG. 10B, the light emitted from the optical fiber F through the tube 2 is irradiated, as direct light, to the living space R.

According to the optical fiber holding structure 14, it is possible to achieve the effects as achieved by the aforementioned optical fiber holding structure 1. In addition, it is possible for the reflection plate 8 to control distribution of the light emitted from the optical fiber F. Alternatively, the reflection plate 8 may be provided on the inner surface of the tube 2.

The optical fiber holding structure according to the present invention is not limited to the aforementioned embodiment and the modifications thereof. For example, the concave-convex structure 23 is not limited to the prism structure formed of flat slant surfaces but may be a prism structure formed in a dot shape. Furthermore, the configuration of the mounting portion of the optical fiber holding structure 12 may be added to the optical fiber holding structure 1. The configurations of the mounting portion and the concave-convex structure of the optical fiber holding structure 12 may be added to the optical fiber holding structures 13 and 14. In addition, the optical fiber holding structures may be used not only in fixing the optical fiber to the ceiling but also in fixing the optical fiber to the wall.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. An optical fiber holding structure, comprising:
a light-transmitting tube configured to cover a surface-light-emitting optical fiber; and
a fixture configured to fix the tube to a building material,
wherein the tube is made of a material having such rigidity that the tube is not bent even when the tube is horizontally fixed by the fixture, the tube having a notch through which the optical fiber is introduced into the tube, and
the fixture includes an engaging portion inserted into the tube through the notch to engage with an inner circumference of the tube, a mounting portion mounted to the building material and a leg portion configured to interconnect the engaging portion and the mounting portion with a predetermined gap left therebetween.

2. The structure of claim 1, wherein the notch is formed in a linear shape or a spiral shape along an extension direction of the tube.

3. The structure of claim 1, wherein the tube includes a concave-convex structure formed on an outer surface or an inner surface thereof to control distribution of emitted light.

4. The structure of claim 3, wherein the concave-convex structure is formed of a prism structure including flat slant surfaces.

5. The structure of claim 1, wherein the leg portion is formed in a band shape so as to extend along the tube, the mounting portion formed in a flat plate shape and connected to the leg portion at a center thereof, the mounting portion becoming thinner as the mounting portion extends away from the leg portion, the mounting portion having screw holes into which screws for fixing the fixture to the building material are inserted.

6. The structure of claim 5, wherein the screw holes are provided so as to interpose the leg portion therebetween and are disposed in an asymmetrical relationship with respect to the leg portion.

7. The structure of claim 1, wherein the tube is made of a material having elasticity, the engaging portion has an opposing surface opposed to the optical fiber, and when the engaging portion engages with the tube, opposite end portions of the opposing surface are formed in a taper shape inclined toward the leg portion as the opposite end portions extend outward.

8. The structure of claim 7, wherein the opposing surface has light reflectivity.

* * * * *